United States Patent
Morson et al.

[11] Patent Number: 5,517,518
[45] Date of Patent: May 14, 1996

[54] METHOD AND ARRANGEMENT FOR RECOGNITION OF A CODED TRANSMITTED SIGNAL

[75] Inventors: Ed Morson, Maple; James Parker, Thornhill, both of Canada

[73] Assignee: Digital Security Controls Ltd., Downsview, Canada

[21] Appl. No.: 317,573

[22] Filed: Oct. 4, 1994

[30] Foreign Application Priority Data

Jul. 21, 1994 [CA] Canada ................................ 2128587

[51] Int. Cl.⁶ .............................. H04B 1/69; H04B 1/707
[52] U.S. Cl. .......................... 375/200; 380/34; 375/206; 375/354; 375/365; 375/367; 375/368
[58] Field of Search ............................ 375/1, 106, 110, 375/111, 114–116, 200–210, 354, 359, 360, 361, 362, 365, 367, 368; 380/34; 364/728.03, 728.06, 728.07

[56] References Cited

U.S. PATENT DOCUMENTS

| | | |
|---|---|---|
| 3,706,933 | 12/1972 | Bidell et al. ............................... 375/1 |
| 3,798,378 | 3/1974 | Epstein ................................ 375/116 X |
| 3,855,576 | 12/1974 | Braun et al. ......................... 375/116 X |
| 4,344,180 | 8/1982 | Commiskey ............................. 375/116 |
| 4,400,790 | 8/1983 | Chambers et al. ............. 364/728.06 X |
| 4,530,103 | 7/1985 | Mosley, Jr. et al. ..................... 375/208 |
| 4,748,623 | 5/1988 | Fujimoto ............................. 375/116 X |
| 4,791,653 | 12/1988 | McFarland et al. .................... 375/115 |
| 4,899,383 | 2/1990 | Einolf, Jr. et al. .................. 375/116 X |
| 4,956,854 | 9/1990 | Bengtson ................................ 375/111 |
| 5,148,453 | 9/1992 | Newby et al. ........................... 375/116 |
| 5,210,754 | 5/1993 | Takahashi et al. .................. 375/116 X |
| 5,218,562 | 6/1993 | Basehore et al. .................. 364/728.03 |
| 5,239,496 | 8/1993 | Vancreaynest ..................... 364/728.03 |
| 5,293,398 | 3/1994 | Hamao et al. .......................... 375/207 |
| 5,373,536 | 12/1994 | Dehner, Jr. et al. .................... 375/106 |
| 5,414,729 | 5/1995 | Fenton .................................... 375/209 |

*Primary Examiner*—Bernarr E. Gregory

[57] ABSTRACT

The present invention is for fast, reliable recognition of coded signals where the signal includes a predetermined code sequence in a lead portion thereof. This has particular application in spread spectrum transmission and receptions. The code sequence is a long sequence of bits known to the receiver which breaks the long sequence into a series of bit segments which are more easily analysed. Each series of bits is analysed for a direct match and a decision whether a code segment has been received is based on the number of direct matches. For example, if there are 8 bit segments, each 16 bits in length, high reliability has been achieved if two direct matches are received within a time period corresponding t the transmission time of the code sequence. This system can also be used for assessing signal strength where many matches indicate good signal strength, approximately 50% indicates moderate signal strength, and less indicating poor signal strength.

14 Claims, 4 Drawing Sheets

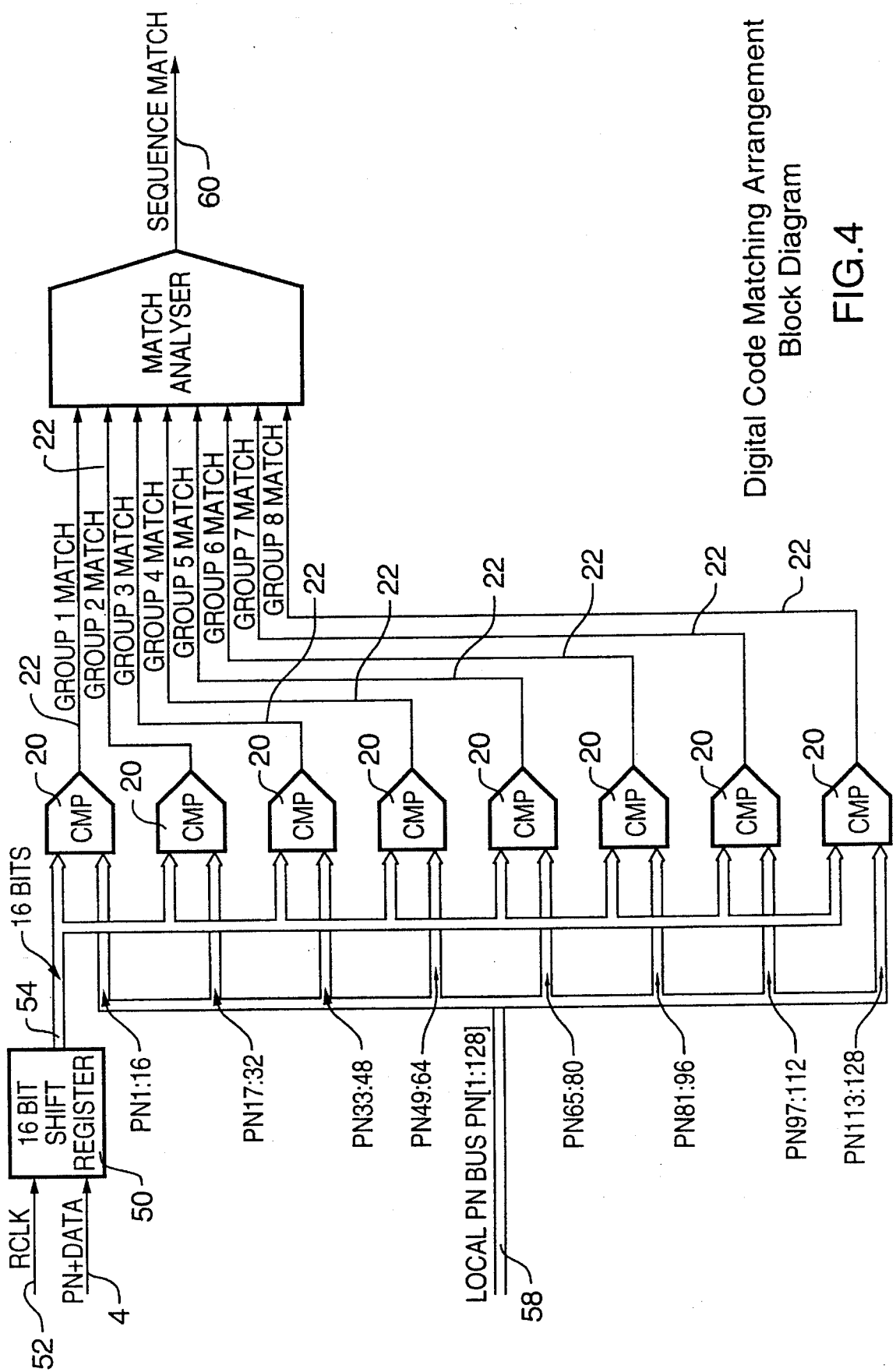

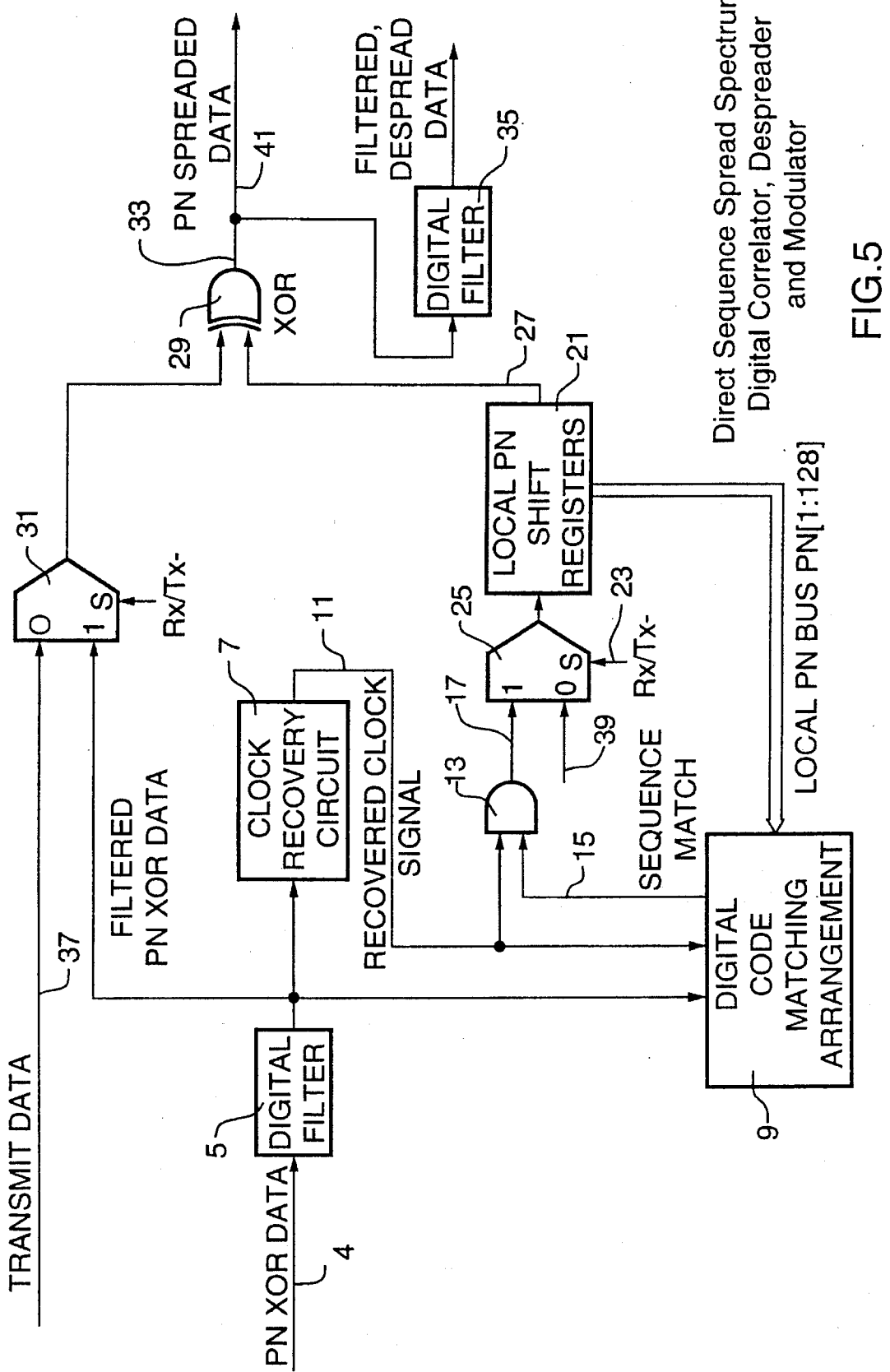

METHOD AND ARRANGEMENT FOR RECOGNITION OF A CODED TRANSMITTED SIGNAL

FIELD OF THE INVENTION

The present application relates to a method for evaluating a coded spread spectrum signal and an apparatus for processing of a coded spread spectrum signal. In particular, the invention relates to a simplified process and apparatus for positively identifying a PN or code sequence which is known both to the transmitter and to the receiver. PN code sequences are particular sequences of bits which are found to be pseudonoise.

Spread spectrum transmissions have been used in security applications and provide effective communication between receivers and transmitters. The FCC regulations with respect to the spread spectrum bands are much easier to comply with and the spread spectrum technology allows multiple transmissions without significant interference.

In spread spectrum transmissions, a pseudonoise code sequence (PN) is known to both the transmitter and the receiver. When a transmitter transmits a signal, there is typically a lead portion of the signal which is a result of transmission of the pseudonoise code sequence (PN) alone. Typically, this pseudonoise code sequence is repeated several times and then is followed by the desired digital data which has been combined with the pseudonoise code sequence and transmitted together.

The receiver, in order to distinguish the signal from noise, must first recognize the transmitted pseudonoise code sequence (PN). Upon recognition of the code sequence, the receiver can then use information from the recognition of the code sequence to synchronize the receiver with the received signal. The received signal can then be processed to remove the pseudonoise code sequence from the desired digital data.

Typically, pseudonoise code sequences are 128 bits in length, and thus, it is extremely unlikely that a bit sequence can be produced by random noise which directly corresponds with this code sequence. These code sequences are available which are known to be immune to this type of false recognition.

The difficulty which the receiver faces is in trying to determine whether a PN code is being received. If there is a direct matching circuit for the entire PN code, there is an extremely high confidence level that the PN code has been received (i.e. a direct match with the PN code has been established). In many cases, a direct match is much too demanding and eliminates the processing of signals, which actually included a PN code which were only partially corrupted. Many applications have tried to determine a bit error rate or degree of correlation with the PN code and process the signal when a high confidence level is achieved.

Once a PN code has been recognized, it is then possible to synchronize the receiver with the received signal and start signal analysis to extract information therefrom.

The present invention provides a simplified arrangement for recognizing of a PN code in a reliable, fast manner. In addition, the present invention provides a method and apparatus for assessing the quality of signals received where the signals are of a predetermined configuration. This is particularly advantageous in spread spectrum applications where it is desired to test a particular location relative to a receiver to determine whether it is in a suitable location. Some locations may be more prone to corruption or interference and alternate locations could be selected. In a preferred aspect of the invention, a receiver is disclosed and a method is disclosed which allows both recognition of PN code sequences as well as analysis of signals used in initial installation of transmitters and receivers or the testing thereof at any desired time.

SUMMARY OF THE INVENTION

A method for identifying a received spread spectrum signal having a particular code sequence repeated therein defined by a predetermined sequence of bits comprises dividing the predetermined series of bits into at least three series of bits where each series has at least eight bits. Providing matching circuits for each series of bits and entering the respective series of bits into the appropriate matching circuit as reference bits forming part of the code sequence. Using the matching circuits to compare the received signal with the series of bits entered into each respective matching circuit. Evaluating the signal for the presence of the code sequence by feeding the received signal to each matching circuit which evaluates the received signal for a direct match with the reference bits stored therein. Upon detecting an initial direct match in any of the matching circuits, using the remaining matching circuits to continue to evaluate the signal for at least a further direct match within a predetermined time period. This predetermined time period is preferably set to correspond to the time required to receive the code sequence. In this way, a second direct match within the time period for transmission of an entire code sequence confirms that the initial match is probably valid.

If at least one further direct match is not determined or received in the time period, then the initial match is ignored and the method is repeated from the beginning to evaluate the received signal for an initial match.

The present invention is also directed to a method of evaluating a digital signal for an approximate assessment of the correlation with a predetermined sequence of bits of a length of at least 32 bits and comprises processing the signals through a series of direct matching circuits where each matching circuit analyses the signal for a direct match with a series of at least eight bits, which form part of the predetermined sequence of bits and wherein the matching circuits collectively evaluate the signal for the predetermined series of bits and uses the output of the matching circuits within a predetermined time period to provide the approximate assessment of the amount of correlation with the predetermined sequence. This method preferably includes starting a clock upon detection of a first match to start the predetermined time period in which at least a second match is to be determined to provide confirmation of a significant correlation with the predetermined sequence of bits, and restarting the method if at least a second match is not determined within the time period.

The invention is also directed to apparatus for carrying out the methods as generally described above. It has been found that by breaking the somewhat long predetermined sequence of bits, particularly as found in a PN code, into smaller segments, it is then possible to use direct matching circuits which are available inexpensively and which indicate that a direct match with a portion of the code has been received. By using a series of these matching circuits such that the entire code sequence is covered (or any desired portion thereof), it is then possible to use the number of matches from the matching circuits to determine whether the code sequence has been received. For example, if the coded sequence was broken into eights segments where each segment is analysed for a direct match, then the number of direct matches within the time period of transmission of the code sequence would give a number of matches out of a possible eight matches, and thus, give a quantified assessment of whether a PN code was received. This is valuable not only for recognition of PN codes used in spread spectrum transmission, but is also valuable in assessing initial installation locations where a specialized signal is sent a number of times and the number of direct matches within a certain time period provides a number from which a general indication of whether the location is poor, satisfactory or excellent can be evaluated. In a preferred form, the specialized code is essentially the PN code repeated many times and a counter counts the number of direct matches and the specialized signal is the normal transmission signal with the PN code repeated many times.

BRIEF DESCRIPTION OF THE DRAWINGS

Preferred embodiments of the invention are shown in the drawings, wherein:

FIG. 4 is a schematic of the matching circuitry; and

FIG. 5 is a schematic of a combination transmitter and receiver which uses the code recognition technique.

DETAILED DESCRIPTION OF THE PREFERRED EMBODIMENTS

Figure 2:
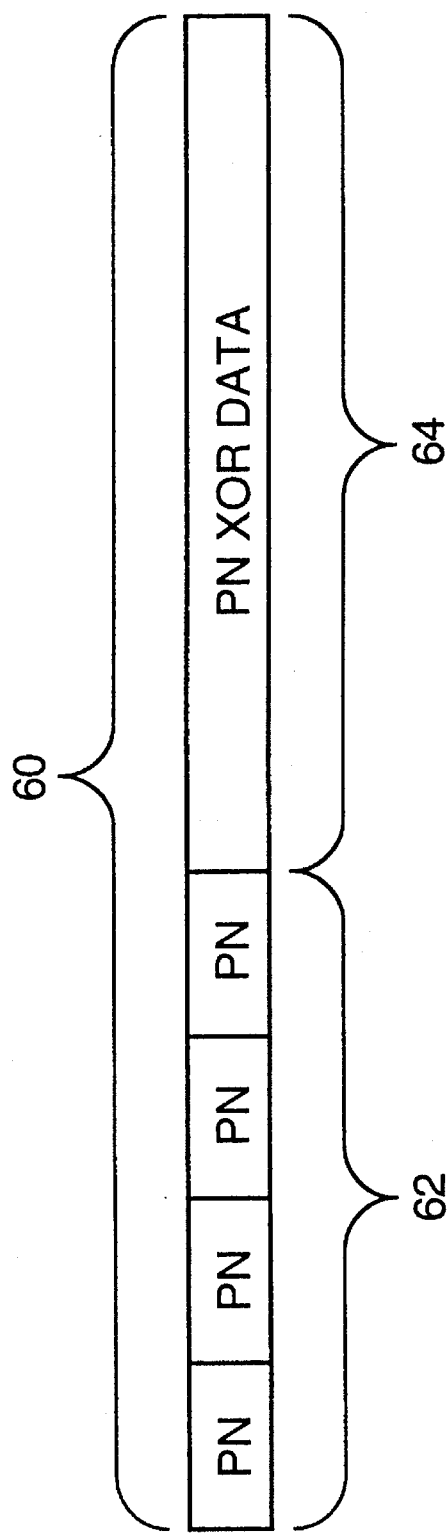
FIG. 2 is an illustration of a spread spectrum transmission having a repeated coded lead portion followed by a coded sequence and data trailing portion.
Figure 3:
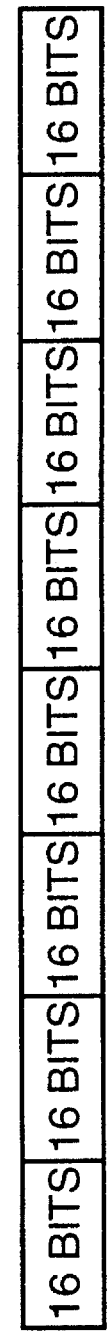
FIG. 3 is an illustration of how a 128 bit pseudonoise code can be broken into eight distinct 16 bit segments.

In spread spectrum systems, both a transmitter 2 and a receiver 10 have knowledge of a particular pseudonoise code sequence (PN) which is used by the transmitter to transmit data and must be used by the receiver to decipher the signals received and to distinguish the signal from noise. In order to allow a receiver an opportunity to recognize a signal as one which has originated from a transmitter, the transmitter typically sends a signal as shown in FIG. 2 where the coded signal 60 has a lead portion where the predetermined code sequence (PN) is repeated a number of times, indicated as lead portion 62, followed by a trailing portion indicated as 64. The trailing portion is basically the PN and data combined and transmitted. The receiver 10 continuously analyses received signals for the predetermined code sequence, which is provided in the lead portion 62. Hopefully, the receiver picks up the first PN, however, for higher degrees of confidence, the PN is repeated at least several times and often as many as sixteen times. It is only after the receiver has recognized a PN in a signal that steps can be taken to synchronize the receiver with the received signal and the data extracted by removal of the effect of the PN code in the trailing portion 64 of the signal.

PN codes are available and are specifically developed to have characteristics very similar to noise, but which can be distinguished therefrom. These pseudonoise code sequences are readily available, and thus, are provided to both the transmitter and the receiver. The preferred PN code for this application is 128 bit linear-in-sequence.

Figure 1:
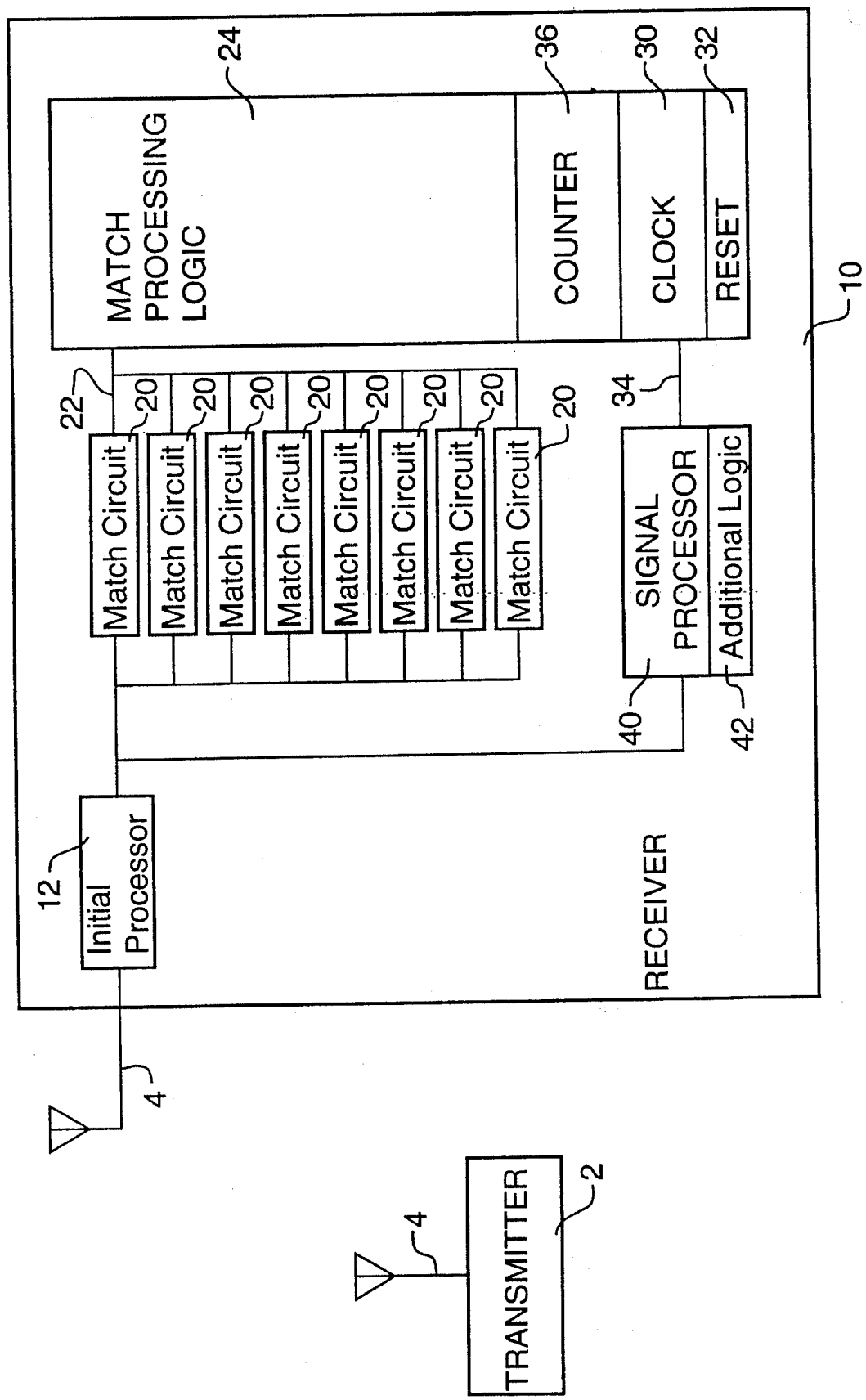
FIG. 1 is a schematic layout of a transmitter and receiver according to the invention.

As shown in FIG. 2, the present invention divides the pseudonoise code sequence into eight code sequences, each of 16 bits in length, and analyses the signal for direct matches in any of these eight segments. As shown in FIG. 1, the receiver 10 includes eight direct matching circuits 20 and any received signal is analysed for a direct match with the 16 bit segments of each matching circuit which collectively define the PN code sequence. Each matching circuit 20 is a shift register, and thus, continuously analyses the signal with respect to the previous 16 bits. These matching circuits are looking for a direct match. This type of direct matching technology is readily available and can perform this function live as the signal is received.

When a direct match is obtained in any of the matching circuits 20. A positive output is provided to the matching processing logic, indicated as 24. The matching processing logic preferably starts a clock, indicated as 30, and thus, defines a predetermined time period in which at least one further direct match must be obtained to provide confirmation of a significant match with the pseudonoise code sequence. For example, a direct match with the fourth matching circuit indicates that there has been a direct match with the bits of the pseudonoise code sequence corresponding to bits 49 through 64. In this example, for whatever reason, there is at least some corruption in the receipt of the code sequence with respect to the first three matching circuits. For example, these matching circuits could only have one bit wrong, but obviously do not provide a direct match to the processing logic. Upon detection of a direct match, the clock then provides a time period for any of the remaining seven matching circuits (5 through 8 and 1 through 3) to confirm that a further match has been obtained. In this way, although there was not a match with the first three matching circuits, sufficient time is preferably provided to allow them to indicate a match in what would be the remaining portion of the first transmission of the PN, followed by a complementary portion of the second transmission of the PN.

It can be appreciated that other logic criteria can apply. For example, the time period need not necessarily correspond to the additional time required for transmission of the remaining portion of the pseudonoise code sequence; one could be looking at a smaller percentage of that or even a larger percentage, depending upon the degree of confidence desired. Furthermore, it can be appreciated that where a higher degree of confidence is required, more than one confirming match should be obtained and the timing of direct matches can be analysed to confirm that, in fact, a code sequence has been received as each of the matching circuits have a time relationship with the other matching circuits. For example, you may require two or more confirming matches.

It can also be appreciated that if you had a match in one circuit which was again confirmed by a further match in that identical circuit of a length of time equal to the pseudonoise coded sequence, this again provides confirmation. The point to be taken from the above is that the code sequence can be broken into a number of discrete segments and these segments can be analysed for direct matches.

In the preferred embodiment described above, the PN code has been divided into 16 bit segments and eight matching circuits have been provided. The basis of this decision is that 16 bit direct matching circuits are an economic compromise. It would be possible to merely look for an 8 bit segment or a smaller bit segment, if desired. Obviously, you would want more than 1 bit segments, but there may be applications where matching with a 4 bit segments is desirable. Due to the ready availability of a 16 bit matching circuit, this is most desirable at this time. Also, higher than 16 bits matching circuits can be used.

The matching process logic 24 includes a reset function, indicated as 32, associated with the clock. If a confirming match is not received within the set time period, the initial match is ignored and the process is started from the beginning.

An output from the match processing logic 24 is shown on line 34 and provides synchronization information for the signal processor 40. When two direct matches are received, this provides the necessary information to allow the signal processor to synchronize itself with the received signal. Once synchronized with the received signal, the signal processor may then go through the process of identifying the actual data by removing of the pseudonoise code sequence.

The signal processor 40, in most cases, will include additional logic, shown as 42, which will provide further confirmation that a match with the pseudonoise code sequence has been achieved and the signal received is one in which it is interested. For example, the trailing portion 64 of the signal 60 would also include identification of the transmitter transmitting the signal, preferably before the transmission of the actual information which it wishes to pass onto the receiver. Therefore, the additional logic 42 can review the signal for the identity of a transmitter and obviously will not be able to process the signal if this is not of the appropriate form. Therefore, the signal processor, even if there is an incorrect matching of PN sequence, will quickly identify this, as the resulting signal will not be of a form that can be appropriately analysed and the receiver can continue to the monitoring function.

As previously described, this matching technology can also be used with respect to providing an indication of the quality of a received signal. This is particularly useful when installing a system.

In a security application, a particular transmitter (i.e. a sensor) can be located in a desired location and a test signal or normal transmission can be sent to a receiver 10. This test signal can include multiple repetitions of a particular signal, preferably the pseudonoise code sequence, including some method of distinguishing it as a test signal. This specialized signal can then be processed by the receiver by counting the number of direct matches within a specified time period. For example, if the specialized signal included eight transmissions of the coded sequence, then there is a potential within that time period of producing sixty-four direct matches (i.e. the potential of eight direct matches per transmission of the PN code). In this specialized function, the number of matches can be fed to a counter, indicated as 36, and the size of the count relative to the potential number of direct matches can provide an assessment of the suitability of the placement of the transmitter to effectively communicate with the receiver. If a low number of matches are received, then the transmitter or receiver can be moved to a new location. Rather than outputting the actual number of direct matches, it is preferred to output the assessment as poor, satisfactory or good.

This test signal capability is preferably included as part of each transmission by merely repeating the PN code sequence a number of times as a lead portion of a transmission. Recognition of a PN code sequence can continue to monitor direct matches for the lead portion and provide a count of the number of matches. Thus, an assessment of the quality of reception of a signal is possible for each transmission. This simplifies the apparatus and software, as the apparatus does not need to operate in a special mode or have special test signals to assess the quality of reception.

A different matching circuit is shown in FIG. 4. In this case, a received signal 4 having the PN+DATA, which is fed into a 16 bit shift register 50. In addition, a clocking signal, indicated as 52, is provided to the shift register. The output of the shift register 50 is provided on line 54 and fed in parallel to each of the matching processors indicated as 20. The last 16 bits of the signal are provided to each of the matching processors and these bits are compared to specified segments of the PN code provided to the matching arrangements 20 via the local PN bus indicated as 58. It can be seen that the top matching arrangement receives bits 1 through 16, the second matching arrangement receives bits 17 through 32, etc., with the last matching arrangement receiving bits 113 through 128. As can be appreciated, if a PN code is being received, there is a potential of each of the matching circuits matching and thus producing eight matches (i.e. no corruption of the PN code), however, the applicant has found that any two direct matches received within a specified time period (typically the transmission duration of the PN code) provides sufficient confidence to decide a PN code has been received. This produces a sequence match indicated as 60.

The structure of FIG. 4 makes the PN code available for other functions as described in FIG. 5.

FIG. 5 is a schematic of a transmitter/receiver for use in transmitting or receiving spread spectrum signals. A received signal of PN+DATA is indicated as 4 and is connected to the digital filter indicated as 5. The output from the digital filter is fed to the clock recovery function 7 and is also fed to the digital code matching arrangement indicated as 9. The digital code matching arrangement 9 also receives the clocking frequency, which has been outputted on line 11. The clocking signal is provided to the AND gate 13, which is also connected to a further output 15 from the digital code matching arrangement 9, which produces the output when at least two matches from the structure of FIG. 4 are received. The AND gate 13 provides an output on connection 17, which basically forms a timing signal and the recovered clocking frequency for the local PN shift registers indicated as 21. The multiplexer 25 also receives a "receive" or "transmit" control function 23 and, in the present explanation, would be in the "receive" mode. The signal provided on 15 is used as part of a timing synchronization function for the PN shift registers 21, which results in an output of the PN code being produced on line 27. This is fed into the XOR gate 29 which also receives the PN+DATA signal 4 via the multiplexer 31. This would be the case when the structure is in the receive mode. By providing the PN code in sequence with the PN+DATA, it is then possible to remove the effect of the PN code and accomplish despreading on output 33, which is then fed to the digital filter 35.

It can also be appreciated that the local PN shift registers, identified as 21, provide information (i.e. the PN code) to the digital code matching arrangement 9.

In the "transmit" mode, data to be transmitted is provided on line 37 and fed to the multiplexer 31. This data is then provided to the XOR gate 29 as shown. In the "transmit" mode, a transmit clocking frequency is provided on line 39 to the multiplexer 25 and results in producing of the PN code on line 27, which is provided to the XOR gate 29. Combining of the PN code with the data provided on line 37 results in spreading of the information and the data can then be transmitted as outputted on line 41.

As can be seen from the above, the storage of the PN code in local PN shift registers allows the digital code matching arrangement 9 to have knowledge of the PN code and also allows production of the PN code in proper timed sequence to, in effect, decode received data or to encode data for transmission via line 41.

The multiplexers 25 and 31 indicate a "0" condition and "1" condition. In the "1" condition, the structure is in the "receive" mode, whereas in the "0" condition, the device is in the "transmit" mode.

For security applications, the combined transceiver of FIG. 5 is useful with respect to any devices requiring two-way communication. This would be true of the alarm panel, a two-way keypad and, in most cases, a two-way audible alarm generator. Sensors, per se, typically are a transmitter only and use a timing arrangement to touch base with the alarm panel, according to a predetermined scheme. The alarm panels are connected to a power supply and are always listening for transmissions. In the case of the transmitters alone, the PN code is known to the transmitter and the transmitter merely has to incorporate the PN code in any transmission. The circuitry for this is well known.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for recognizing whether a received signal includes therein a repeated spreading code segment and wherein the spreading code segment is defined by a predetermined sequence of bits, said method comprising dividing the predetermined series of bits into at least 3 series of bits where each series has at least 8 bits, providing a matching circuit for each series of bits and entering each series of bits into said matching circuit as reference bits to which the received signal will be compared, and evaluating the received signal for the presence of the spreading code segment by feeding the received signal to said at least 3 matching circuits where each matching circuit evaluates the received signal for a match with the reference bits stored therein;

upon detecting an initial match in any of said matching circuits continuing to monitor the remaining matching circuits for at least a further match within a predetermined period of time, upon detecting at least a further match within the time period producing an output signal indicating a positive match has been assessed and if at least one further match is not determined in the time period ignoring the initial match and return to evaluating the received signal for an initial match.

2. A method as claimed in claim 1 including using timing information from at least one of said initial match or said at least further match to synchronize the received signal with a processor for further evaluation thereof.

3. A method as claimed in claim 1 said time period is at least sufficient to correspond to the time required to receive the the entire spreading code segment minus the time required to receive the initial match.

4. A method as claimed in claim 1 including feeding the signal to at least 4 matching circuits.

5. A method as claimed in claim 4 including providing different output signals depending upon the number of matches received within the time period, and using the different output signals to assess the quality of the signal received.

6. A method as claimed in claim 5 wherein each matching circuit carries out a match of a 16 bit series.

7. A method as claimed in claim 5 including feeding the signal to at least 8 matching circuits.

8. A method as claimed in claim 7 wherein each matching circuit carries out a match of a 16 bit series.

9. A method as claimed in claim 8 wherein said method is carried out for a spread spectrum security signal.

10. A method as claimed in claim 9 wherein a PN code for a spread spectrum signal entered as said predetermined series in said matching circuits.

11. A method as claimed in claim 5 including using timing information from said matches to synchronize with the received signal for further evaluation thereof.

12. A method as claimed in claim 11 wherein each matching circuit carries out a match of a 16 bit series.

13. A method as claimed in claim 12 including feeding the signal to at least 8 matching circuits.

14. A method as claimed in claim 4 wherein each matching circuit carries out a match of a 16 bit series.

\* \* \* \* \*